Patented Apr. 12, 1938

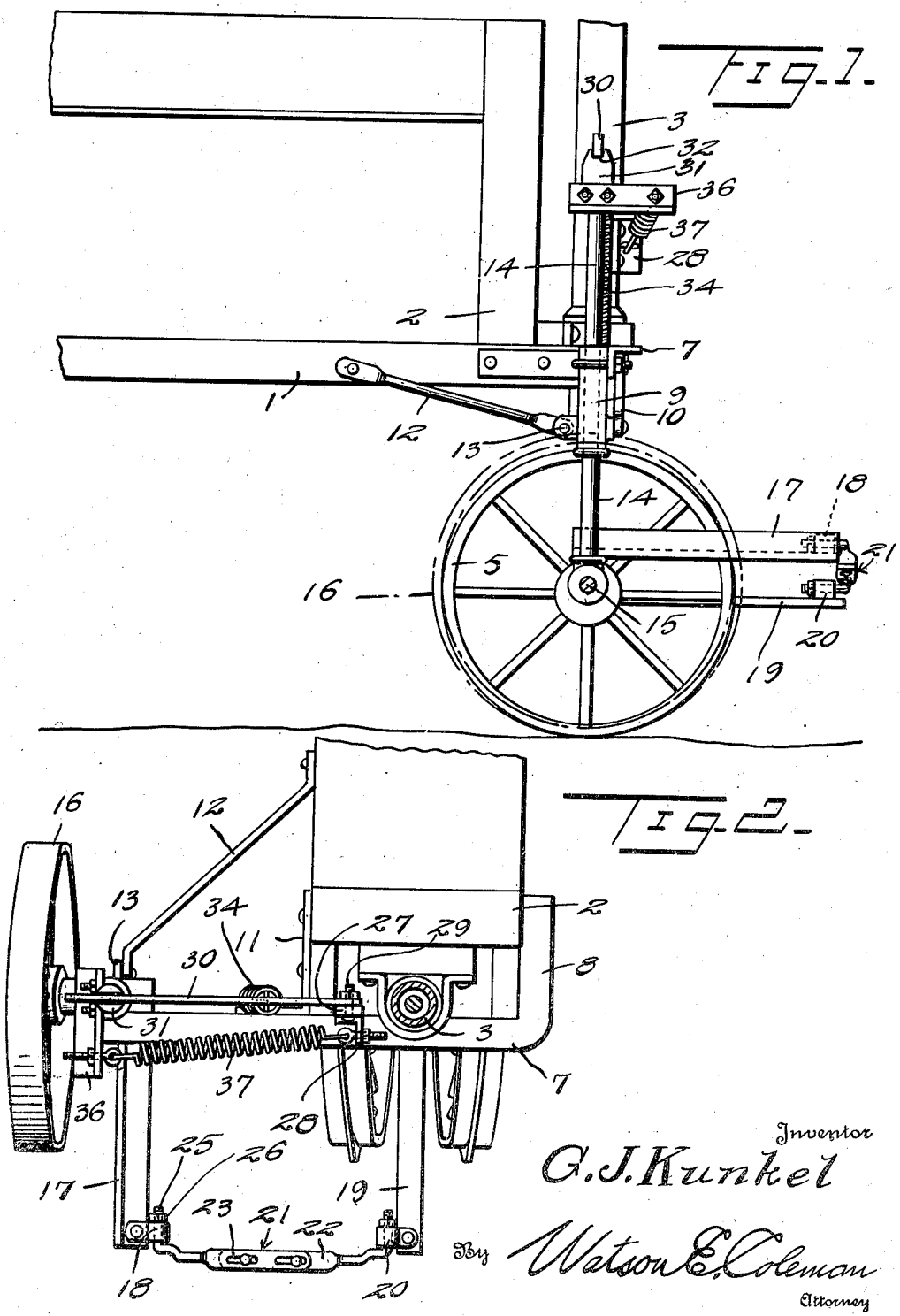

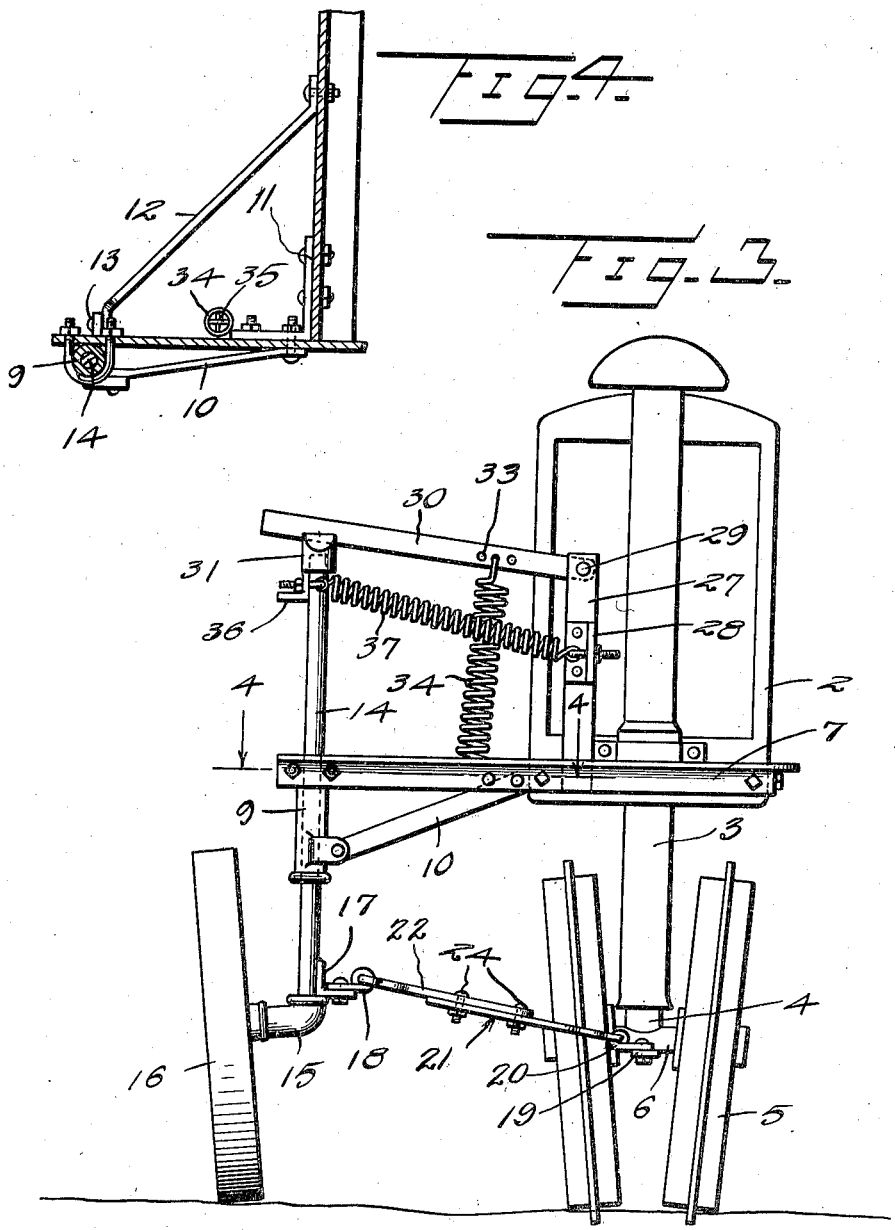

2,113,889

UNITED STATES PATENT OFFICE 2,113,889

AUTOMATIC TRACTOR STEERING MECHANISM

Gregory J. Kunkel, Adrian, Minn.

Application September 30, 1937, Serial No. 166,660

6 Claims. (Cl. 97—49)

This invention relates to wheeled vehicles and pertains particularly to automatic steering devices for the same.

The present invention has for its primary object to provide an improved steering control mechanism for use in association with tractors employed for pulling plows whereby the steering of the tractor is automatically taken care of through the instrumentality of a furrow forming wheel which is mounted at the front end of the tractor and which actuates mechanism connected with the tractor front wheels.

Another object of the invention is to provide an improved steering control mechanism for tractors of the type in which the front wheels are disposed in closely spaced downwardly convergent relation, the device having novel means for coupling a furrow following wheel with the axle between the tractor front wheels whereby the oscillation of the latter by the furrow following wheel may be easily accomplished.

A further object of the invention is to provide in a mechanism of the above described character, a novel means for maintaining the furrow following steering wheel in contact with the landside of the furrow and also for maintaining the wheel firmly compressed against the underlying portion of the earth whereby the wheel will quickly return to position in the furrow after passing over an obstruction such as a stone or root.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Fig. 1 is a view in side elevation of the steering mechanism embodying the present invention, the same being shown applied to a tractor.

Fig. 2 is a view in top plan of the mechanism, a portion of the tractor structure being in horizontal section.

Fig. 3 is a view in front elevation of the mechanism with adjacent parts of the tractor.

Fig. 4 is a section taken on the line 4—4 of Fig. 3.

Referring now more particularly to the drawings wherein like numerals of reference designate corresponding parts throughout the several views, the numeral 1 generally indicates the front portion of a tractor frame which supports the tractor radiator 2 and which has secured thereto the vertically disposed housing 3 for the front wheel steering post 4. Upon the lower end of this post there are supported the relatively closely related downwardly converging front wheels 5, the connection between these wheels and the post here being illustrated as being through the medium of a short horizontal axle 6.

The automatic steering mechanism embodying the present invention comprises a main horizontal or breast beam 7 which is disposed across the front of the frame portion 1 of the tractor and has one end turned rearwardly as indicated at 8, to position along one side of the tractor frame. The other end of the beam 7 extends laterally from the tractor, as illustrated in Figs. 2 and 3, and has secured to its outer end the vertically arranged bearing sleeve 9. The lower portion of this sleeve is braced by a suitable brace bar 10 which has one end attached to the sleeve, as shown in Fig. 3 while the other end is secured to the beam 7 adjacent the frame 1. Brace means for the beam 7 consists of the angle bracket 11, shown in Fig. 2, one side of which is attached to the adjacent side of the tractor frame while the other side is attached to the rear of the beam 7 and the rearwardly extending bar 12, one end of which is attached to the side of the frame 1 rearwardly of the bracket 11 while the other end is attached to an ear 13 formed as an integral part of the lower end of the bearing sleeve 9. Thus the bar 12 serves the double function of bracing the lower end of the sleeve 9 and the outer end of the beam 7.

Extending vertically through the bearing sleeve 9 is a steering post 14 which is auxiliary to the main steering post 4 of the tractor and may hereinafter be referred to as the auxiliary steering post. The lower end of this post carries the laterally extending stub axle 15 upon which is mounted the furrow following or guide wheel 16. This wheel is preferably tilted or canted slightly so that the top thereof will lie outwardly from the tractor with respect to the furrow in which the lower part of the guide wheel is located.

At the lower end of the auxiliary steering post 14, an arm 17 is fixed at one end to project forwardly beyond the wheels 5 and 16. This arm is rigid with the post 14 so that any oscillation of the post will cause the forward end of the arm to swing in a horizontal plane. At the forward end of the arm 17 there is pivotally attached the ear 18 and extending outwardly from the axle 6 which is carried at the lower end of the main steering post 4, is a steering arm 19 which, upon its forward end, carries a similar ear 20 which is pivotally attached thereto. The forward ends of the arms 17 and 19 are disposed substantially in alinement transversely of the tractor and the ears 18 and 20 are coupled together by the two-part adjustable coupling link which is indicated as a whole by the numeral 21. While this link may be of any suitable construction, it is here illustrated as consisting of the two flat portions 22 arranged one upon and longitudinally of the other with one of the portions having the two longitudinally extending slots 23 for the reception of bolts 24 which pass through openings in the underlying one of the bars. It will be readily apparent that by loosening these bolts, the two flat bar portions may be readily shifted so as to increase or decrease the overall length of the coupling between the ears. The outer ends of the bar portions 22 terminate in the lateral fingers 25, each of which is pivotally engaged in the loop formed at the outer end of an ear and maintained in position therein by the nut 26 which is threaded on the finger and engages one side of the adjacent ear loop.

Secured to and extending upwardly from the beam 7 at a point a substantial distance inwardly from the free end of the beam, is a rigid standard 27 which has a bracket 28 secured thereto at a point substantially midway of its ends and which has pivotally attached to its upper end, as at 29, one end of the vertically oscillatable press bar 30.

The upper end of the auxiliary steering post 14 has mounted thereon the cap 31 which has a slot 32 formed across the top thereof and the lower edge of the press bar 30 adjacent its outer end engages in this slot.

Between the pivot 29 and the head 31, the bar 30 has several apertures formed, as indicated at 33, and in one of these apertures is engaged one end of the contractile spring 34 which extends downwardly and has its other end attached to the beam 7 in any suitable manner, as by means of a bracket 35 carried by the beam. Thus it will be seen that the spring 34 constantly tends to shift the auxiliary steering post 14 downwardly through the bearing sleeve 9 and the degree of pressure or force exerted by the spring may be varied by shifting the upper end of the spring either toward the free outer end of the bar 30 or toward the attached inner end, coupling the spring with the bar in one of the several apertures 33.

Adjacent the upper end of the auxiliary steering post 14, a short forwardly extending arm 36 is attached and between the forward end of this arm and the bracket 28 carried by the standard 27, is a contractile spring 37. Since the arm 36 extends forwardly from the post 14, the action of the spring 37 is to oscillate the post 14 in a direction tending to move the fore-part of the auxiliary steering wheel 16 inwardly toward the tractor. This constantly maintains the fore-part of the steering wheel against the vertical or landside of the furrow and thus guarantees the proper following of the wheel 16 in the furrow.

In addition to the spring 37 holding the auxiliary steering wheel in the proper position in a furrow, the vertical spring 34 will make certain the constant engagement of the lower part of the wheel in the bottom of the furrow so that should the wheel 16 ride up over a rock, root or clod of earth, it will be quickly forced down again into the bottom of the furrow by the spring 34 as soon as it passes over the obstruction. The cap 31 has the upper end of the post 14 rotatable in a socket in its underside so that the post may move about a vertical axis without interference from the cap and the press bar 30.

With the steering mechanism embodying the present invention attached to the front of a tractor, as described, no attention to the steering of the tractor is required on the part of the tractor operator except where the tractor has to be turned around after it reaches the end of the furrow or as it is necessary to move the tractor from one place to another when there is no furrow for the wheel 16 to engage in and follow.

What is claimed is:—

1. A steering mechanism for a tractor having a front steering post carrying a pair of wheels at its lower end, comprising a support secured to the body of the tractor at the front thereof, a vertically disposed auxiliary steering post carried by said support laterally of the tractor and adapted to have oscillatory movement on a vertical axis and longitudinal movement, an auxiliary steering wheel rotatably supported upon the lower end of said auxiliary post, coupling means between said first post and the auxiliary post whereby oscillation of the latter post will effect similar oscillation of the first mentioned post, resilient means coupled with the auxilary post for normally turning the auxiliary steering wheel into the landside of a plow furrow, and resilient means normally tending to force said auxiliary steering post longitudinally downwardly.

2. A steering mechanism for a tractor having a front steering post carrying a pair of wheels at its lower end, comprising a support secured to the body of the tractor at the front thereof, a vertically disposed auxiliary steering post carried by said support laterally of the tractor and adapted to have oscillatory movement on a vertical axis and longitudinal movement, an auxiliary steering wheel rotatably supported upon the lower end of said auxiliary post, coupling means between said first post and the auxiliary post whereby oscillation of the latter post will effect similar oscillation of the first mentioned post, resilient means coupled with the auxiliary post for normally turning the auxiliary steering wheel into the landside of a plow furrow, a bar pivotally supported at one end and having its other end disposed across the upper end of the auxiliary steering post and loosely coupled therewith, and spring means coupling said bar with a fixed part of the steering apparatus and constantly exerting downward pressure of the bar upon the upper end of the auxiliary post.

3. A steering mechanism for a tractor having a vertically disposed steering post at its front and a pair of wheels supported upon the lower end of said post, comprising a supporting beam secured transversely of the front part of the tractor and extending at one end laterally of the tractor, a bearing sleeve secured vertically to the laterally extended end of the beam, an auxiliary steering post extending vertically through said sleeve and adapted to have longitudinal and oscillatory movement therein, a stub axle at the lower end of said auxiliary post, an auxiliary steering wheel rotatably mounted upon said stub axle, resilient means constantly urging the oscillation of said auxiliary post in a direction to turn the fore-part of the auxiliary steering wheel inwardly toward the tractor wheels, an arm projecting forwardly from the lower end of the auxiliary post, an arm projecting forwardly from the lower end of the main post, and a link connection between the forward ends of said arms.

4. A steering mechanism for a tractor having a vertically disposed steering post at its front and a pair of wheels supported upon the lower end of said post, comprising a supporting beam secured transversely of the front part of the tractor and extending at one end laterally of the tractor, a bearing sleeve secured vertically to the laterally extended end of the beam, an auxiliary steering post extending vertically through said sleeve and adapted to have longitudinal and oscillatory movement therein, a stub axle at the lower end of said auxiliary post, an auxiliary steering wheel rotatably mounted upon said stub axle, resilient means constantly urging the oscillation of said auxiliary post in a direction to turn the fore-part of the auxiliary steering wheel inwardly toward the tractor wheels, an arm projecting forwardly from the lower end of the auxiliary post, an arm projecting forwardly from the lower end of the main post, a link connection between the forward ends of said arms, and resilient means constantly exerting pressure downwardly against the top end of the auxiliary steering post.

5. A steering mechanism for a tractor having a vertically disposed steering post at its front and a pair of wheels supported upon the lower end of said post, comprising a supporting beam secured transversely of the front part of the tractor and extending at one end laterally of the tractor, a bearing sleeve secured vertically to the laterally extended end of the beam, an auxiliary steering post extending vertically through said sleeve and adapted to have longitudinal and oscillatory movement therein, a stub axle at the lower end of said auxiliary post, an auxiliary steering wheel rotatably mounted upon said stub axle, resilient means constantly urging the oscillation of said auxiliary post in a direction to turn the fore-part of the auxiliary steering wheel inwardly toward the tractor wheels, an arm projecting forwardly from the lower end of the auxiliary post, an arm projecting forwardly from the lower end of the main post, a link connection between the forward ends of said arms, a cap supported upon the top end of the auxiliary steering post, a fixed standard extending upwardly from said beam, a bar pivotally attached at one end to the upper end of the standard and having its other end extending across and engaging in a slot in said cap, and a contractile spring coupling said bar with an underlying fixed part of the structure to constantly maintain downward pressure through the bar against the upper end of said auxiliary post.

6. A steering mechanism for a tractor having a vertically disposed steering post at its front end and a pair of wheels mounted upon the lower end of the post, comprising a brace beam secured transversely of the front of the tractor and having one end projecting a substantial distance laterally thereof, a vertically disposed auxiliary steering post maintained at the outer end of said beam for oscillatory and vertical movement, a stub axle at the lower end of said post, an auxiliary steering wheel carried by said stub axle, an arm projecting forwardly from and rigid with the lower end of the auxiliary post, an arm projecting forwardly from and rigid with the lower end of the first post, an adjustable link connection between the forward ends of said arms, a fixed standard carried by said beam between the steering posts, an arm projecting forwardly from the upper end of the auxiliary post, a contractile spring coupling the forward end of the last arm with said standard, a bar pivotally attached to the upper end of the standard and extending across and coupled with the upper end of the auxiliary post, and a contractile spring coupling said bar with an underlying fixed part of the mechanism, the said connection between the bar and the upper end of the auxiliary post facilitating oscillation of the post under the bar.

GREGORY J. KUNKEL.